ELECTRONIC CONTROL CIRCUIT FOR PERFORATORS

Filed Aug. 5, 1950 4 Sheets-Sheet 1

INVENTOR
RANSOM D. SLAYTON
BY Emery Robinson
ATTORNEY

Sept. 2, 1952 R. D. SLAYTON 2,609,444

ELECTRONIC CONTROL CIRCUIT FOR PERFORATORS

Filed Aug. 5, 1950 4 Sheets-Sheet 2

INVENTOR
RANSOM D. SLAYTON
BY Emery Robinson
ATTORNEY

Sept. 2, 1952 R. D. SLAYTON 2,609,444

ELECTRONIC CONTROL CIRCUIT FOR PERFORATORS

Filed Aug. 5, 1950 4 Sheets-Sheet 3

INVENTOR
RANSOM D. SLAYTON
BY Emery Robinson
ATTORNEY

Sept. 2, 1952 R. D. SLAYTON 2,609,444

ELECTRONIC CONTROL CIRCUIT FOR PERFORATORS

Filed Aug. 5, 1950 4 Sheets-Sheet 4

INVENTOR
RANSOM D. SLAYTON
BY Emery Robinson
ATTORNEY

Patented Sept. 2, 1952 2,609,444

UNITED STATES PATENT OFFICE 2,609,444

ELECTRONIC CONTROL CIRCUIT FOR PERFORATORS

Ransom D. Slayton, Elmhurst, Ill., assignor to Teletype Corporation, Chicago, Ill., a corporation of Delaware Application August 5, 1950, Serial No. 177,791

15 Claims. (Cl. 178—17)

Figure 1:
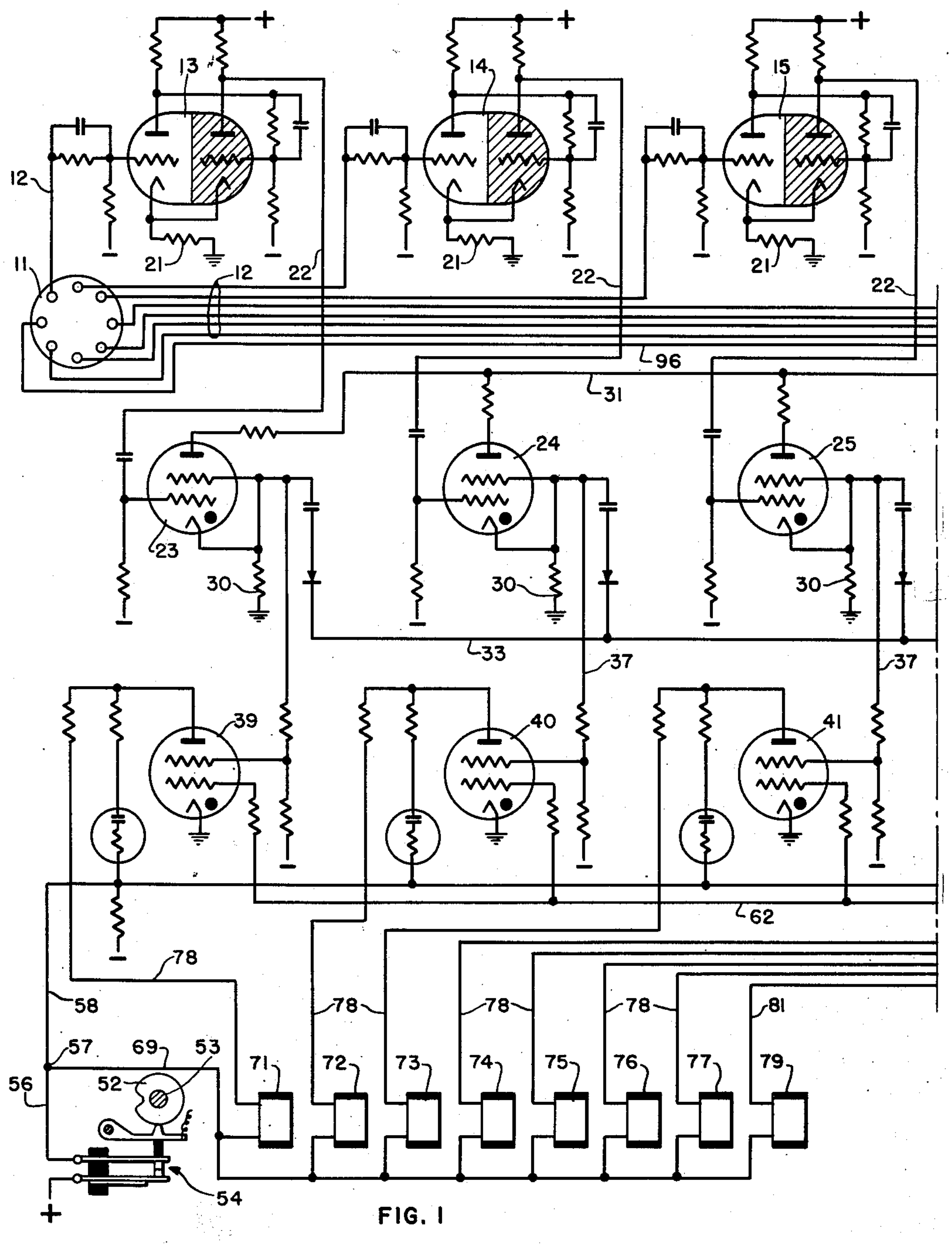

The present invention pertains to control circuits and more particularly to control circuits utilized with high speed punches or perforators.

Many control circuits are utilized in the prior art in conjunction with standard perforators or punches and usually include relay or condenser storage devices. However, with the previously utilized devices the speed of operation is not very great, but, in the telegraph field, generally is of the order of sixty to seventy-five words per minute, where one word consists of five alphabetical characters or numerals and one space character.

The present invention is designed to operate with high speed perforating devices, such for instance as that disclosed in co-pending application Serial No. 148,797, filed on March 10, 1950, in the name of W. J. Zenner. Such perforating apparatus is designed to achieve efficient performance at speeds of between six hundred and sixteen hundred words per minute. As a result of such high speed operation the prior known control circuits including the storage devices mentioned above will not permit satisfactory operation.

Accordingly, an object of the present invention is to provide a control circuit for utilization with a high speed perforator operating in excess of six hundred words per minute.

A second object of the invention is to provide a control circuit which utilizes electronic means as greatly as possible.

A further object of the invention is to provide a control circuit for the purpose described which will necessitate a minimum of maintenance and replacement of parts.

Still further objects of the invention will become apparent during the following description of the apparatus.

The present invention comprises generally a series of electronic amplifiers for receiving permutations of code signal elements indicative of the characters to be perforated from some suitable source. The amplified signals are in turn stored in a plurality of primary gas storage tubes. It might be noted at this point that the amplifiers and storage tubes are equal in number to the components or element positions of the particular code being utilized. Accordingly, while seven positions have been indicated in the instant disclosure representative of a 7-unit code it is of course obvious that the device will operate satisfactorily for a code utilizing a greater or less number of units. The selection stored in the primary gas storage tubes will be transferred at a suitable time under the control of the continuously operating perforating equipment to a series of secondary gas storage tubes. The secondary gas storage tubes in turn control a plurality of perforator control magnets which operate to allow the perforation of the desired character in the recording medium. The device also includes a tape feed control for stepping the tape or recording medium at the desired time and an overlap circuit so that the device will function to allow perforating of a particular character even though the receipt of signals in the storage devices and the transfer thereof may be early or late with respect to the control from the perforating equipment.

Figure 2:
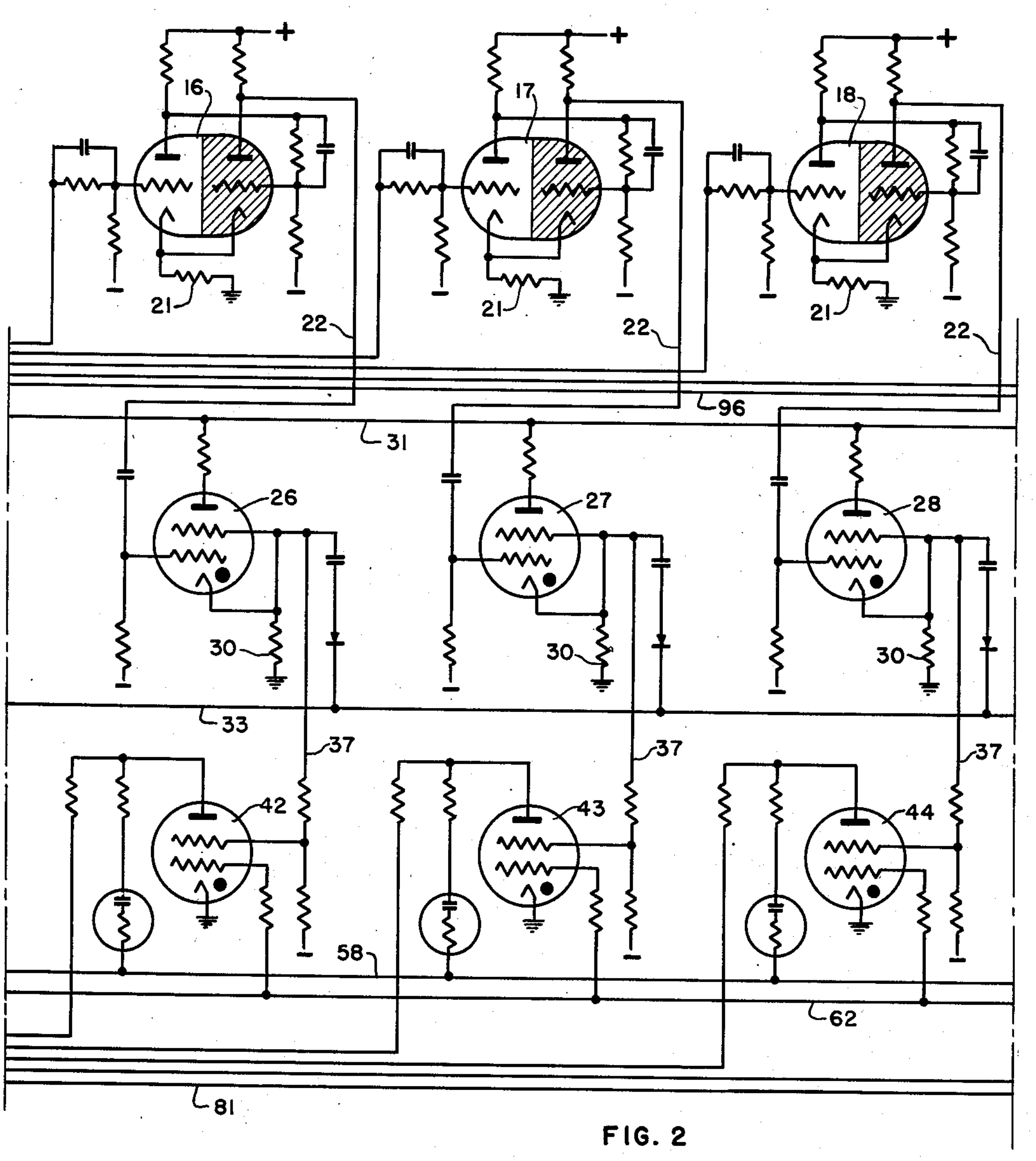
Figure 4:
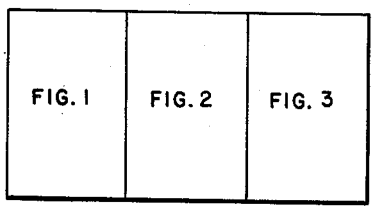
Figure 3:
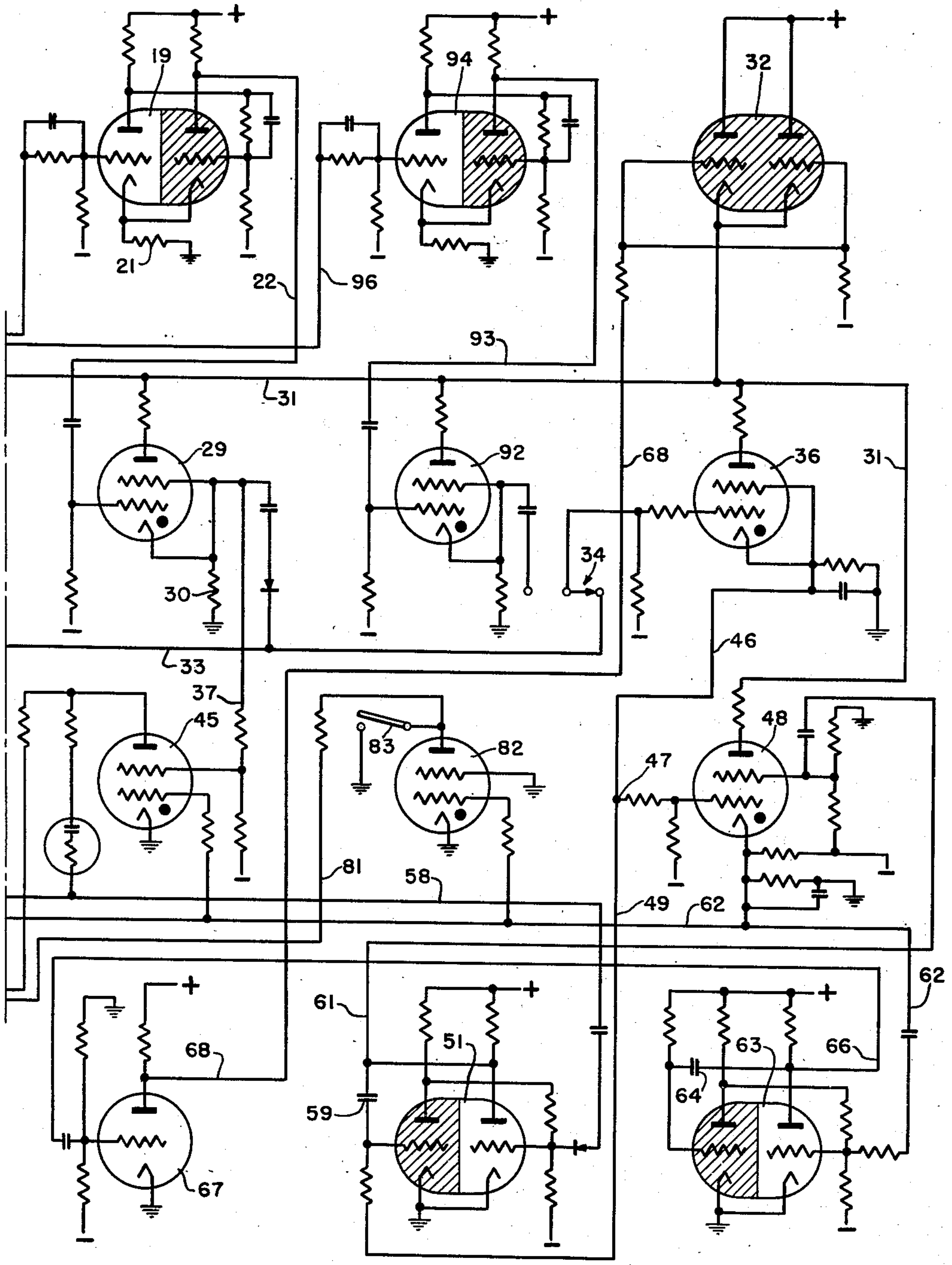
Figure 5:
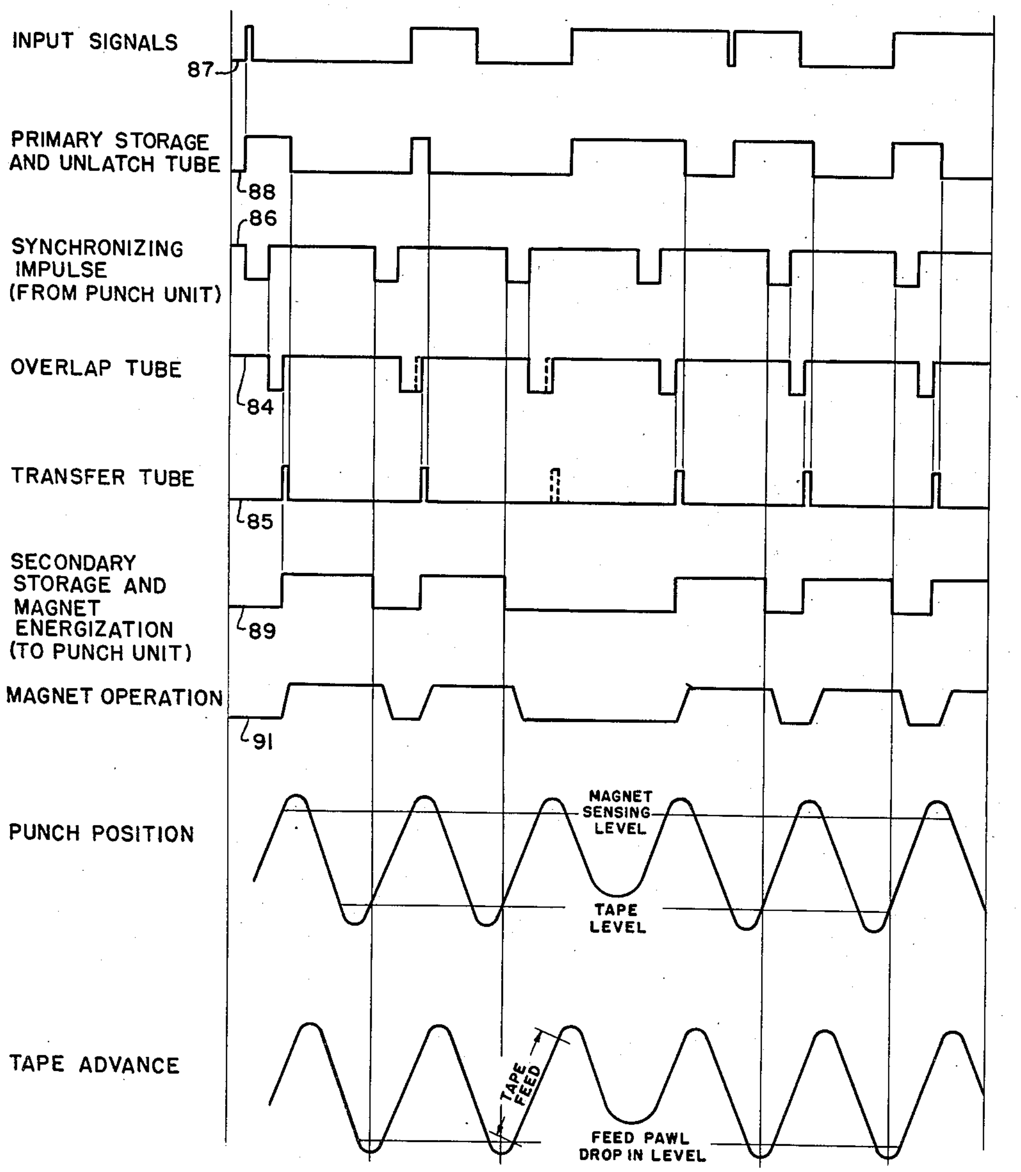

A more complete understanding may be had of the invention when the following detailed description thereof is read in conjunction with the accompanying drawings, which illustrate as follows:

Figs. 1–3, inclusive, illustrate schematically the components forming the present invention;

Fig. 4 is a block diagram illustrating the proper arrangement of Figs. 1–3, inclusive, to form an operative apparatus; and Fig. 5 is a timing diagram illustrating diagrammatically the various intervals of operation of certain of the components with respect to each other.

At the outset of the description it should be noted that the instant invention is being described as operating in conjunction with the invention disclosed and described in the above mentioned patent application to Zenner. Accordingly, only as much of the perforating equipment will be disclosed in this application as to permit a complete understanding of the invention.

Referring now to Fig. 1, it may be seen that a connector 11 is provided, which connector will be in operative cooperation with a suitable source of permutation code signals being received at a high rate of speed. The connector 11 is provided with seven conductors 12, each of which is assigned to a particular element or impulse position of a 7-unit code signal as mentioned previously. In the event that a 5-unit code were to be utilized only five conductors 12 would be present, in place of the seven, etc. for various other codes.

The conductors 12 are connected through suitable resistor-condenser paralleled circuits to the normally negatively biased grids of the left-hand portion of a series of twin vacuum triode tubes 13 to 19, inclusive. The left-hand sections of the tubes 13 to 19, inclusive, operate in conjunction with their normally conducting right-hand sections thereof to form amplifiers. It might be noted that even though the grids of the right-hand sections of the mentioned triodes receive negative bias that they also receive positive bias in a greater degree through their connection to the anodes of the left-hand sections of the triodes and therefor, as stated, the right-hand sections of the tubes will be normally conducting.

In the event that a marking impulse is impressed to the connector 11, it will appear as a positive potential on the particular conductor 12 according to its position in the code signal designation. Such positive impulse, if it be assumed to appear on the conductor 12 associated with the tube 13, will cause the normal negative bias on the grid thereof to be raised to a positive value allowing the left-hand section of the tube 13 to be rendered conducting. The immediate result of such an occurrence is that the positive potential which had previously been impressed from its anode circuit to the grid of the right-hand portion of the tube will drop to a negative potential, resulting in the right-hand portion of the tube being rendered nonconducting. The transition in conduction is practically instantaneous, being accelerated by the action of current in common cathode resistor 21. The interval of nonconduction of the right-hand portion of the tube 13 will continue until the cessation of the positive impulse applied to the grid of the left-hand section of tube 13. These code impulses may be of greater or lesser duration, the only requirements being that they are applied substantially simultaneously to all conductors 12, subside before the application of the code impulses for the next ensuing character, and that two successive character groups not have their beginnings closed together than the cyclic rate of the controlled perforator.

At the instant that the right-hand portion of the tube 13 is first rendered nonconducting a positive potential impulse from its anode circuit will be impressed over a connecting conductor 22 through an appropriate condenser to the normally negatively biased control grid of an associated primary gas tube 23. The main function of tube 13 is to so amplify the input signals that these positive impulses are of a regular fixed amplitude. Since the screen grid of the tube 23 is at ground potential, and assuming anode potential to be present, the tube will be rendered conducting.

The above description is by way of example only and it should be understood that in the event that a positive impulse is present for any of the remaining 6-units of the code signal, the amplifiers 14 to 19, inclusive, will operate similarly over connecting conductors 22 to their associated primary gas storage tubes 24 to 29, inclusive, respectively. Likewise, each of the amplifier circuits is provided with a cathode coupling resistor 21 for a purpose similar to that described above.

It should also be noted that in instances where the signal source is of sufficient amplitude that it would not be necessary to include the amplifiers 13 to 19, inclusive, but instead the code signal elements or impulses may be passed directly to the primary storage tubes 23 to 29, inclusive.

The anodes of the tubes 23 to 29, inclusive, are connected over a common conductor 31 to the cathodes of a twin vacuum triode 32, both portions of which are normally conducting. The tube 32 is in effect a cathode follower and conducts during the operation of the apparatus except at such time as it is desired to release the selection in the tubes 23 to 29, inclusive, as will appear hereinafter.

The tubes 23 to 29, inclusive, as mentioned, are of the gas variety and therefor once rendered conducting by sufficient potential on the grids thereof will continue to conduct irrespective of grid potential until such time as the anode potential is decreased to a sufficient level to prevent sustaining of further conduction. The output of the tubes 23 to 29, inclusive, is impressed in one circuit through suitable condensers and crystal diodes or rectifiers to a common conductor 33 which is connected through a manually operable switch, indicated generally by the numeral 34, to the normally negatively biased control grid of a gas unlatch tube 36. It might be noted that the anode of the tube 36 is also connected to the common conductor 31 and thence to the cathodes of the tube 32 for obtaining operating potential. The screen grid of the tube 36 is at ground potential and therefor if any of the primary storage tubes 23 to 29, inclusive, are rendered conducting their anode current will cause a positive potential drop in their cathode circuit resistors 30, with the subsequent production of a positive impulse on the common conductor 33 so that the tube 36 will be rendered conducting.

The output circuits of the tubes 23 to 29, inclusive, are not only connected to the common conductor 33 but they are also connected over individual conductors 37 and through appropriate resistors to the normally negatively biased screen grids of a plurality of secondary gas storage tubes 39 to 45, inclusive. However, because of the negative bias on the control grids of these tubes, at this time the positive potential impressed upon the screen grids will not be sufficient in itself to allow any of the tubes to become conducting, but instead will act as a conditioning potential only.

It was mentioned above that the tube 36 would be rendered conducting upon a marking impulse being stored in any of the primary gas storage tubes 23 to 29, inclusive. Assuming that the tube 36 is conducting its output potential will be impressed from its cathode circuit over a conductor 46 to junction point 47 and thence through an appropriate resistor to the normally negatively biased control grid of a gas transfer tube 48. Such potential on the control grid of the tube 48 will not be sufficient to cause the tube to be rendered conducting but instead will act as a conditioning potential only, awaiting sufficient positive potential upon the normally negatively biased screen grid thereof to render the tube conducting.

The positive potential from the output of the tube 36 which was impressed on the conductor 46 to the junction point 47 is also impressed over a conductor 49 and through an appropriate resistor to the grid of the normally conducting left-hand section of a twin triode vacuum overlap tube 51. However, as the left-hand section of the tube 51 is normally conducting this positive potential will simply add a greater potential to the grid circuit thereof.

If reference is again made to Fig. 1, it may be seen that a cam 52 is provided secured to a shaft 53. The shaft 53 operates continuously under the control of the perforating mechanism and when the instant invention is utilized with the perforator of the above mentioned Zenner application it will correspond to the shaft 28 therein. The cam 52 controls a contact pair indicated generally by the numeral 54, so that during each revolution of the shaft 53 the contact pair 54 will be opened momentarily. It might be noted that the operation of the shaft 53 and thus the contact pair 54 is irrespective of the receipt of input signals on the conductors 12 but instead is under the sole control of the continuously operating perforating mechanism.

At such time as the contact pair 54 is closed following the momentary opening, positive potential will be impressed from battery over an obvious circuit, through the contact pair 54, over a conductor 56 to junction point 57, and thence over a conductor 58 and through an appropriate condenser and rectifier to the normally negatively biased grid of the right-hand normally nonconducting portion of the tube 51. The positive potential impulse so produced will be sufficient to allow the right-hand portion of the tube 51 to be rendered conducting.

At such time as the right-hand section of the tube 51 is rendered conductive a negative impulse will be impressed over its connecting anode conductor and through a condenser 59 to the grid of the normally conducting left-hand portion of the tube. This will result in the left-hand portion of the tube being rendered non-conducting for an interval sufficient for the negative charge of the condenser 59 to leak off. It should be remembered that it was mentioned previously that the grid of the left-hand portion of the tube 51 might be at ground potenial or at a positive potential depending upon whether the tube 36 were conducting or not. Such a differential of potential will cause a difference in the interval of time necessary for the negative charge to leak from the condenser 59, for a purpose which will be described more in detail hereinafter.

At such time as the negative charge leaks from the condenser 59 the left-hand section of the tube 51 will again be rendered conducting, resulting through its anode connection to the grid of the right-hand portion thereof, in the latter portion of such tube being rendered nonconducting. At this time the anode potential of the right-hand portion of the tube, 51 will increase rapidly resulting in a positive impulse being impressed over a conductor 61 and through an appropriate condenser to the normally negatively biased screen grid of the tube 48.

As it was assumed that the tube 36 was conducting and its output circuit was supplying a conditioning potential over the conductor 46 to the control grid of the tube 48, the tube 48 will be rendered conducting upon the subsequent potential impression on the conductor 61 to its screen grid, just mentioned.

It should be noted that if erratic operation of the contact pair 54 following its initial closing should affect the operation of the tube 51, this could be obviated by the interposition of a triode pulse inverter between the contact pair and the tube 51, input connection to the latter then being made to the grid of the left-hand section. The positive potential from the contact pair 54 would be inverted into a negative impulse which would cut off the left-hand section of the tube 51, and thereafter further operations of the added triode would have no effect on the grid of the tube 51, the latter being driven well negative by the potential being applied through the condenser 59.

Upon the tube 48 becoming conducting positive potential will be impressed from its output cathode circuit over a common conductor 62 and through appropriate resistors to the control grids of the secondary gas storage tubes 39 to 45, inclusive. At this time any of the tubes 39 to 45, inclusive, will be rendered conducting which has received a conditioning potential on its screen grid, over the individual conductors 37 from the output circuit of the primary gas storage tubes 23 to 29 inclusive. Thus the components of the signal which had been received as individual impulses over the conductors 12 will now be stored in the tubes 39 to 45, inclusive.

It should be pointed out that in the event that a spacing or no-current impulse had been received there would have been no change of conduction in the amplifiers 13 to 19, inclusive and likewise no conduction of the associated tubes 23 to 29, inclusive. Under this condition it is obvious that there will be no conduction of the tube 48 and the supplying of operating potential to the control grids of the tubes 39 to 45, inclusive, as the tube 36 will not be rendered conducting to supply a conditioning potential to the tube 48.

During the interval that the tube 48 is conducting, the potential impressed from its output cathode circuit to the common conductor 62 is also impressed through an appropriate condenser to a normally negatively biased grid of the normally nonconducting right-hand section of a twin triode vacuum transfer timer tube 63. The right-hand section of the tube 63 will be rendered conducting by the application of the potential impulse, and through its anode connection to the grid of the normally conducting left-hand section thereof will cause such section to be rendered nonconducting. Such status of the tube sections will be retained for an interval during which the negative potential leaks off from a condenser 64, and thereafter the conduction will be reversed: that is, the left-hand section will again be rendered conducting and the right-hand section nonconducting. Sufficient time is allowed for the potential leakage of the condenser 64 to insure reception of a complete signal in the tubes 23 to 29, inclusive and the transfer thereof to the tubes 39 to 45, inclusive, even though each transfer should begin almost instantaneously after the reception of a first code impulse of a character group with the consequent operation of the tubes 36 and 48.

At such time as the right-hand section of the tube 63 is rendered nonconducting potential will rapidly increase on its anode circuit and will be impressed over a conductor 66 and through an appropriate condenser to the normally negatively biased grid of a normally nonconducting triode tube 67. The tube 67 is in effect a biased amplifier. At such time as the tube 67 is rendered conducting, which is momentary only because of the condenser in the conductor 66, potential in its anode circuit will decrease with a similar decrease in potential on a conductor 68 connected thereto. The conductor 68 is connected through an appropriate resistor and normally supplies positive bias to the grids of the two sections of the normally conducting tube 32. Thus when the tube 67 conducts the two portions of the tube 32 will be rendered nonconducting and as the tube is a cathode follower, a similar decrease in the potential will occur on the cathode circuits thereof.

At such time as the sections of the tube 32 are rendered nonconducting potential will no longer be impressed over the common conductor 31 to the anodes of the primary gas storage tubes 23 to 29, inclusive. Thus, if any of these tubes had been conducting, indicative of a marking impulse stored therein, such tubes will now be rendered nonconducting. The effect of this is simply to release the stored signal in the primary storage tubes in readiness for the receipt of a subsequent signal on the conductors 12.

Further, as potential no longer exists on the conductor 31 the anode potential for allowing conduction of tubes 36 and 48 will no longer be present causing both of these tubes to be rendered nonconducting, in readiness for receipt of the next code signal and transfer thereof to the secondary storage tubes. It should of course be kept in mind that the signal stored in the primary storage tubes will not be released until such time as the transfer is effected to the secondary storage tubes 39 to 45, inclusive.

During the discussion above of the transfer of conduction to the secondary gas storage tubes 39 to 45, inclusive, it must be kept in mind that not only is it necessary to have a conditioning potential upon the conductors 37 and an operating potential on a common conductor 62, but also the contact pair 54 must be closed. This is necessary in order that a complete circuit may be established which may be traced from positive battery, through the contact pair 54, over the conductor 56 to the junction point 57, over a common conductor 69, through the windings of individual punch magnets 71 to 77, inclusive, over individual conductors 78, through appropriate resistors to the anodes of the tubes 39 to 45, and thence through the tube to the cathode circuit and ground. Thus, during this interval not only are the secondary gas storage tubes 39 to 45 rendered conducting in accordance with the permuted signal, but the appropriate punch selector magnets 71 to 77, inclusive, are likewise energized to set the perforating mechanism in readiness to perforate the signal.

During the time that the contact pair 54 is closed a circuit is also established which may be traced from positive battery, through the closed contact pair 54, over the conductor 56, to the junction point 57, over the common conductor 69, through the winding of a tape feed magnet 79, over a conductor 81, and through an appropriate resistor to the anode of a normally nonconducting gas tape feed control tube 82. The control grid of the tube 82 is connected to the common conductor 62, which supplies operating potential for the control grids of the secondary gas storage tubes 39 to 45, inclusive, and as the screen grid thereof is at ground potential, at such time after the contact pair 54 is closed that operating potential appears on the conductor 62 the tube 82 will be rendered conducting. The only effect of the tube 82 being rendered conducting is to complete the establishment of the circuit for the energization of the tape feed magnet 79. Accordingly, even though the contact pair 54 be closed, in the event that control grid potential does not exist at the tube 82, such tube may not be rendered conducting and thus no tape feed will occur. This of course is necessary for, as stated previously, the shaft 53 and perforating mechanism operate irrespective of the receipt of code signals in the electronic control circuits. Therefore, by utilizing the tube 82 the tape will only be stepped at such time as a signal has been received by the instant apparatus, which at times may reduce considerably the amount of tape utilized.

A manually operable switch 83 is provided in the anode circuit of the tube 82 which when closed would supply ground potential to the common conductor 81. Under these circumstances if it is ever desired to feed the tape in the perforating equipment when signals are not being received by the instant control apparatus, closure of the switch 83 will result in ground potential being supplied for the energization of the feed magnet 79 irrespective of the tube 82 upon closure of the contact pair 54.

During the previous description of the operation of the apparatus it was mentioned that the grid of the left-hand portion of the tube 51 might be at two potential levels: that is, either the ground level or a positive level. Further, it was indicated that this provided for different times necessary for the leakage of negative potential from the condenser 59 upon the right-hand portion of the tube 51 being rendered conducting. This in turn alters the times at which the positive potential will be impressed on the conductor 61 serving as operating potential for the transfer tube 48.

It should be remembered at this time that the perforating mechanism operates independently of the signals delivered to the electronic control circuit described herein and that therefore positive potential on the conductor 58 resulting from closure of the contact pair 54 may be impressed to the grid of the right-hand portion of the tube 51 at varying times with respect to the receipt of code signal impulses on the conductors 12. Accordingly, if the tube 36 is conducting, signifying the receipt of a code signal or a portion of a code signal in the primary storage tubes 23 to 29, inclusive, it may be understood that it is not necessary that the transfer to the secondary storage tubes be delayed for any appreciable length of time, but in fact should be facilitated. On the other hand, if no such signal has been received, but one is anticipated, it is desirable that it be immediately transferred from primary to secondary storage, and if the right-hand portion of the tube 51 is held in the conducting condition for a longer period of time, the tube 36 may become conducting during this period, with the appropriate action then taking place.

In view of these facts, the cathode potential output of the tube 36, as mentioned previously, is impressed on the conductors 46 and 49 to the grid of the left-hand portion of the tube 51 giving the grid a positive bias. Under these conditions and upon receipt of positive potential to the grid of the right-hand section of the tube 51 from a subsequent closure of the contact pair 54, the resulting negative potential impressed to the condenser 59, as described previously, will leak off faster than under the opposite condition, and when the right-hand portion of the tube 51 then ceases conducting the tube 48 will be rendered conducting at an earlier time than if the tube 36 were nonconducting. This will cause the early transfer of signals from primary to secondary storage, with the subsequent releasing of the primary storage tubes 23 to 29, inclusive, in anticipation of the reception of the next code signal permutation. If the latter signal were earlier than normal, for a number of reasons, it otherwise might be received while the primary storage tubes were being released and the character would then be lost.

If instead of the condition described above the tube 36 is not conducting, signifying that no marking impulse has been received in the primary storage circuits, the grid of the left-hand section of the tube 51 will be at ground potential by virtue of the connection through the low value resistor to ground in the cathode circuit of the tube 36. Under this condition the receipt of positive potential on the grid of the right-hand portion of the tube 51 resulting from closure of the contact pair 54 causes a similar negative charge to be stored in the condenser 59. However, as the grid return circuit is at ground potential the negative charge will not leak off as rapidly as when the grid is at a positive value and therefore a longer interval of time will be available during which it would be possible to receive a code signal in the tubes 23 to 29, inclusive, with the immediate transfer thereof to the tubes 39 to 45, inclusive. Under these conditions, signals which occur earlier than normal are immediately accommodated without loss. The normal sequence of timing during continuous operation is that the time of operation of the primary tubes 23 to 29, inclusive, decreases regularly with the tube 51 operating for the shortest interval until the tube 36 begins to be first rendered conducting during the mentioned interval. This interval then increases until the cycle occurs on which the tube 48 just fails to fire because the tube 36 did not prime it in time. The punch accordingly makes one cycle with none of its magnets energized, during which time the character remains in the primary storage tubes. With the tube 36 conducting, the tube 51 next operates for the short interval and the entire process is repeated.

By reference to Fig. 5 it is believed that the above conditions may be seen in graph 84 wherein it is shown that the interval of conduction of the right-hand portion of the tube 51 varies. Further, graph 84 illustrates the conduction of the right-hand portion of the tube 51, with respect to the impulse received, due to the closure of the contact pair 54 shown in graph 86, and that the latter occurs at a fixed rate while the received signals shown on graph 87 occur at random. It may be seen that the period of conduction of the transfer tube 48, shown in graph 85, is invariable with respect to duration but that its time of occurrence varies in accordance with the operating period of the overlap tube 51, shown in graph 84. It might be pointed out at this time that the various intervals illustrated individually in graph 87 are not illustrative of a single impulse interval but instead illustrate the relative time of simultaneous reception of all of the elements in the code character.

Fig. 5 also illustrates the operating times of various other of the components of the apparatus with respect to those already mentioned and with respect to each other. For instance, graph 88 illustrates the interval of operation of the primary storage tubes 23 to 29, inclusive, graph 89 illustrates the interval of operation of the secondary storage tubes 39 to 45, inclusive, graph 91 the operation of the magnets 71 to 77, inclusive, and 79, and the bottom two graphs the movement of the punches and the tape advancements respectively. It is believed that it is not necessary to describe further in detail the various illustrated graphs but that instead, during the description of the apparatus, reference to them will result in a better understanding of the method of operation and the timing thereof of the various elements in the invention.

It must be remembered that during the above description of the operation of the apparatus it was stated that in the event that no code signals were received, or rather no marking impulses in a code signal, that the tube 36 would not be energized and that therefore the sequence of operation necessary for tape feed through conduction of the tube 82 would not occur. Such a condition operates satisfactorily in many modes of telegraph communication where it is not desired to transmit blank signal conditions and therefore it is not necessary to incorporate them in the perforated tape. This is particularly true of systems where blank signals are transmitted during periods of no signal transmission over the system.

However, in certain methods of transmission, and particularly for cipher traffic, it is necessary that all signals be transmitted over the signal channel. Accordingly, it is desirable that provision be made for apparatus to be able to operate under both modes of communication where blank signals are either deleted or included. Accordingly, an embodiment of the invention has been provided to allow the perforation and thus subsequent transmission of blank signals.

By referring to Fig. 3 it may be seen that the manually operable switch 34 may be re-positioned so that instead of connecting the output of the tubes 23 to 29, inclusive, to the control grid of the tube 36, such control grid may be connected by means of an obvious circuit to the output circuit of a normally nonconducting gas tube 92.

The normally negatively biased control grid of the gas tube 92 is connected through an appropriate condenser and over a conductor 93 to the anode circuit of the normally conducting right-hand portion of a twin vacuum triode 94. The normally negatively biased grid of the left-hand portion of the tube 94 is connected over a conductor 96 to the connector 11.

With this alternative method of operation it is contemplated that a predetermined pulse will be sent or impressed to the conductor 96 for each code signal including a blank code signal. Upon the receipt of such impulse on the conductor 96 and to the grid of the left-hand portion of the tube 94 such portion will be rendered conducting and through a circuit similar to that described with respect to tube 19 the right-hand portion thereof will be rendered nonconducting.

Upon the right-hand portion of the tube 94 being rendered nonconducting its anode potential will increase resulting in potential being impressed on the conductor 93 to the control grid of the tube 92 causing the latter tube to be rendered conducting. It might be noted at this time that the anode of the tube 92 is connected to the common conductor 31 and therefore it may be understood that at such time as the primary storage tubes are released, as described previously, a similar occurrence will result for the tube 92.

Upon the tube 92 being rendered conducting its output potential will be impressed through the now closed manually operable contact 34 to the control grid of the tube 36, allowing the tube to be rendered conducting in a manner as described previously. Thereafter the operation of the various circuits will be effected with the result that the tube 82 will be rendered conducting and the feed magnet 79 energized at a particular time in a cycle of the operation of the apparatus to step the tape. In view of the fact that it was assumed that blank signal had been received none of the punch magnets 71 to 77, inclusive, will be energized and so no marking impulses will be perforated in the tape. Thereafter the apparatus will be in readiness to receive the subsequent code signals which will allow operation of the apparatus in a manner as described.

It may be seen that with operation of the apparatus under this alternative method the tape feed and release of the mechanism for affecting a transfer from the primary to the secondary storage tubes is not under the control of receipt of a marking impulse but instead is directly controlled by receipt of the control pulse on the conductor 96.

It should be kept in mind when considering the operation of the various circuitry or considering the configuration in the various graphs of Fig. 5 that the operation of the various devices is extremely rapid in order that it may control a perforator which is operating in excess of six hundred words a minute.

While a specific embodiment of the invention has been described utilizing specific circuitry and components, it is obvious that the invention is not limited to such specific circuitry and components, but instead alterations and additions may be made within the scope and spirit of the invention.

What is claimed is:

1. In combination with a continuously operating perforator provided with timing means and perforator control means, a source of code signal impulses, means for receiving the code impulses of a signal simultaneously, primary storage means controlled by said receiving means for storing the code impulses, secondary storage means, and transfer means controlled by said timing means for transferring the stored code impulses to said secondary storage means for controlling operation of said perforator control means.

2. In combination with a continuously operating perforator provided with timing means and perforator control means, a source of code signal impulses means for receiving the code impulses of a signal simultaneously, primary storage means controlled by said receiving means for storing the code impulses, secondary storage means, transfer means controlled by said timing means for transferring the stored code impulses to said secondary storage means for controlling operation of said perforator control means, and means controlled by said transfer means for releasing operation of said primary storage means after the storage transfer has been effected.

3. In combination with a continuously operating perforator provided with timing means and perforator control means, a source of code signal impulses composed of marking and spacing permutations, means for receiving the code impulses of a signal simultaneously, primary storage means controlled by said receiving means for storing the code impulses, secondary storage means, transfer means controlled by said timing means for transferring the stored code impulses from said primary storage means to said secondary storage means for controlling operation of said perforator control means, and means responsive to the storage in said primary storage means of a code signal including at least one marking impulse for releasing said transfer means for operation.

4. A circuit in combination with a continuously operating signal controlled perforator having timing means and perforator selector magnets, including a plurality of signal receiving and amplifying means equal in number to the code impulses of the received signals for receiving the code impulses of a signal simultaneously, a plurality of primary storage tubes one of which is associated with each of said receiving and amplifying means, transfer means, a plurality of secondary storage tubes one of which is associated with each of said primary storage tubes, means responsive to the operation of one of said primary storage tubes for releasing said transfer means for operation, and means controlled by said timing means and said transfer means for effecting a transfer of the storage from said primary tubes to said secondary tubes for controlling said perforator selector magnets.

5. A circuit in combination with a continuously operating signal controlled perforator having timing means and perforator selector magnets, including a plurality of signal receiving and amplifying means equal in number to the code impulses of the received signals for receiving the code impulses of a signal simultaneously, a plurality of primary storage tubes one of which is associated with each of said receiving and amplifying means, transfer means, a plurality of secondary storage tubes one of which is associated with each of said primary storage tubes, means responsive to the operation of one of said primary storage tubes for releasing said transfer means for operation, means controlled by said timing means and said transfer means for effecting a transfer of the storage from said primary tubes to said secondary tubes for controlling said perforator selector magnets, and means operating after the storage transfer to release the primary storage tubes, whereby a succeeding signal may be stored therein.

6. A circuit in combination with a continuously operating signal controlled perforator having timing means and perforator selector magnets, including a plurality of signal receiving and amplifying means equal in number to the code impulses of the received signals for receiving the code impulses of a signal simultaneously, a plurality of primary storage tubes one of which is associated with each of said receiving and amplifying means, transfer means, a plurality of secondary storage tubes one of which is associated with each of said primary storage tubes, means responsive to the operation of one of said primary storage tubes for releasing said transfer means for operation, means controlled by said timing means and said transfer means for effecting a transfer of the storage from said primary tubes to said secondary tubes for controlling said perforator selector magnets, and variable means for timing the storage transfer with respect to the signal storage in said primary storage means.

7. In combination with a continuously operating mechanism for perforating a medium having timing means and perforator selector means, a source of code signal impulses, means for receiving the code impulses of a signal simultaneously, primary storage means controlled by said receiving means for storing the code impulses, secondary storage means, transfer means controlled by said timing means for transferring the stored code impulses to said secondary storage means for controlling operation of said perforator selector means, and means controlled by said timing means and said transfer means for imparting step-by-step motion to said medium.

8. In combination with a continuously operating perforator having timing means and perforator selector means, a source of signals each composed of intelligence impulses and a control impulse, means for receiving the intelligence impulses of a signal simultaneously, primary storage means controlled by said receiving means, secondary storage means, transfer means controlled by said timing means for effecting a transfer of the intelligence impulses stored in said primary storage means to said secondary storage means for controlling said perforator selector means, means for receiving the control impulse, and means controlled by said control impulse receiving means for releasing said transfer means for operation.

9. In combination with a continuously operating perforator having timing means and perforator selector means, means for receiving intelligence code impulses of a signal simultaneously, primary storage means controlled by said receiving means, secondary storage means, transfer means controlled by said timing means for effecting a transfer of the code impulses stored in said primary storage means to said secondary storage means for controlling said perforator selector means, means responsive to the storage of a code signal having at least one marking impulse in said primary storage means for releasing said transfer means for operation, means responsive to the receipt of a control impulse with the code signal for releasing said transfer means for operation, and means for selecting one or the other of said transfer releasing means for operation.

10. In combination with a continuously operating perforator provided with timing means and perforator control means, a source of code signal impulses, primary storage means under the control of the simultaneously receipt of the code impulses of a signal for storing such impulses, secondary storage means, and transfer means controlled by said timing means for transferring the stored code impulses to said secondary storage means for controlling operation of said perforator control means.

11. In combination with a continuously operating perforator provided with timing means and perforator control means, a source of code signal impulses composed of marking and spacing permutations, primary storage means under the control of the simultaneous receipt of the impulses of a signal for storing such impulses, secondary storage means, transfer means controlled by said timing means for transferring the stored code impulses from said primary storage means to said secondary storage means for controlling operation of said perforator control means, and means responsive to the storage in said primary storage means of a code signal including at least one marking impulse for releasing said transfer means for operation.

12. In combination with a continuously operating perforator provided with timing means and perforator control means, a source of code signal impulses, primary storage means under the control of the simultaneous receipt of the code impulses of a signal for storing such impulses, secondary storage means, and transfer means including a delay circuit controlled by said timing means for transferring the stored code impulses to said secondary storage means for controlling operation of said perforator control means, said delay circuit ensuring the transfer of a complete code signal in the event that the impulses thereof are received other than simultaneously.

13. In combination with a continuously operating perforator for perforating a medium having timing means and perforator control means, a source of code signal impulses composed of marking and spacing permutations, primary storage means under the control of the simultaneous receipt of the code impulses of a signal for storing such impulses, secondary storage means, transfer means controlled by said timing means for transferring the stored code impulses from said primary storage means to said secondary storage means for controlling operation of said perforator control means, means responsive to the storage in said primary storage means of a code signal including at least one marking impulse for releasing said transfer means for operation, and means controlled by said transfer means when released for operation for imparting step-by-step motion to said medium.

14. In combination with a continuously operating mechanism for perforating a medium having timing means and perforator selector means, a source of code signal impulses, primary storage means under the control of the simultaneous receipt of the code impulses of a signal, secondary storage means, transfer means controlled by said timing means for transferring the stored code impulses to said secondary storage means for controlling operation of said perforator selector means, and means for imparting step-by-step motion to said medium conditioned for operation by said timing means at invariable intervals and operated by operation of said transfer means at variable intervals.

15. In combination with a continuously operating perforator provided with timing means and perforator control means, a source of successive code signals, primary storage means under the control of the simultaneous receipt of the code impulses of a signal for storing individual signals successively, secondary storage means, and transfer means operating variably controlled by said timing means for transferring the stored code signal from said primary storage means to said secondary storage means prior to the receipt of the succeeding code signal in said primary storage means for controlling operation of said perforator control means.

RANSOM D. SLAYTON.

REFERENCES CITED

The following references are of record in the file of this patent:

UNITED STATES PATENTS

| Number | Name | Date |
|---|---|---|
| 2,400,574 | Rea et al. | May 21, 1946 |
| 2,456,740 | Schuler | Dec. 21, 1948 |